United States Patent
Beier et al.

(10) Patent No.: US 11,797,419 B2
(45) Date of Patent: Oct. 24, 2023

(54) TASK-SPECIFIC LOGGING IN DIGITAL COMPUTER SYSTEMS

(71) Applicant: International Business Machines Corporation, Armonk, NY (US)

(72) Inventors: Felix Beier, Haigerloch (DE); Eberhard Schoeck, Altdorf (DE); Christian Wilhelm Paul Hoerst, Boeblingen (DE); Stefan Renner, Stuttgart (DE); Johannes Severin Kern, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/656,222

(22) Filed: Mar. 23, 2022

(65) Prior Publication Data
US 2023/0305943 A1  Sep. 28, 2023

(51) Int. Cl.
G06F 11/36 (2006.01)
G06F 11/07 (2006.01)
G06F 11/30 (2006.01)
G06F 11/32 (2006.01)

(52) U.S. Cl.
CPC ...... *G06F 11/3612* (2013.01); *G06F 11/0772* (2013.01); *G06F 11/3075* (2013.01); *G06F 11/3086* (2013.01); *G06F 11/321* (2013.01); *G06F 11/366* (2013.01); *G06F 11/3624* (2013.01)

(58) Field of Classification Search
None
See application file for complete search history.

(56) References Cited

U.S. PATENT DOCUMENTS

| | | | |
|---|---|---|---|
| 7,661,032 B2 | 2/2010 | Eberbach | |
| 9,459,911 B2 | 10/2016 | Liu | |
| 10,078,571 B2 | 9/2018 | Altman | |
| 10,235,252 B1 | 3/2019 | Lieberman | |
| 11,055,192 B2 | 7/2021 | Yang | |
| 2011/0153616 A1* | 6/2011 | Torres | G06F 11/327 707/E17.049 |
| 2011/0320884 A1 | 12/2011 | Thilagar | |
| 2013/0346980 A1* | 12/2013 | Branch | G06F 11/3428 718/100 |
| 2014/0007119 A1* | 1/2014 | Liu | G06F 9/466 718/102 |
| 2015/0347264 A1* | 12/2015 | Mohammed | G06F 9/45558 714/45 |
| 2016/0294649 A1* | 10/2016 | Russell | G06F 16/21 |

(Continued)

OTHER PUBLICATIONS

"logd—A versatile log daemon", github.com, nomota, last printed Mar. 17, 2022, 1 pages, <https://github.com/nomota/logd>.

(Continued)

*Primary Examiner* — Qing Chen
(74) *Attorney, Agent, or Firm* — Michael A. Petrocelli

(57) ABSTRACT

A technique for logging tasks in a computer system. Tasks are logged into the computer system by executing at least one task at the computer system. A set of log metadata and a set of log levels of log records of the at least one task may be determined from an execution log output of the at least one task. Execution outputs of a further task may be determined according to the determined set of log metadata and associated set of log levels.

20 Claims, 5 Drawing Sheets

(56) References Cited

U.S. PATENT DOCUMENTS

| | | |
|---|---|---|
| 2017/0168915 A1 | 6/2017 | Doi |
| 2018/0113578 A1 | 4/2018 | Yoon |
| 2020/0201750 A1 | 6/2020 | Gadiya |
| 2021/0149790 A1 | 5/2021 | Renner |
| 2021/0374036 A1* | 12/2021 | Perkins, Jr. ......... G06F 11/3612 |

OTHER PUBLICATIONS

"Logger.properties file for configuring logger settings", IBM Documentation, WebSphere Application Server / 9.0.5, Last updated: Nov. 4, 2021, 4 pages, < https://www.ibm.com/docs/en/was/9.0.5?topic=application-loggerproperties-file-configuring-logger-settings>.

Disclosed Anonymously, "First Failure Data Capture (FFDC) Technique", An IP.com Prior Art Database Technical Disclosure, IP.com No. IPCOM000222155D, IP.com Electronic Publication Date: Sep. 20, 2012, 5 pages, <https://priorart.ip.com/IPCOM/000222155>.

Sun, et al., "First Failure Data Capture in Embedded System", IEEE EIT 2007 Proceedings, pp. 183-187, <https://ieeexplore.ieee.org/document/4374434>.

\* cited by examiner

TASK-SPECIFIC LOGGING IN DIGITAL COMPUTER SYSTEMS

BACKGROUND

The present invention relates to the field of digital computer systems, and more specifically, to a method for logging tasks in a computer system.

Programs executing on a computer system may cause problems with the stability of the computer system and/or contain execution errors. Log messages in log files may be used to study these errors and problems. However, the log messages have increased in volume and complexity, rendering their processing a challenging task.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for logging tasks in a computer system, comprising:
executing at least one task (named at least one test task) at the computer system;
determining from an execution log output of the at least one task a set of metadata and a set of log levels of log records of the at least one task; (named determining step);
executing a further task; and
logging execution outputs of the further task according to the determined set of metadata and associated set of log levels.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system being configured for: executing at least one task at the computer system; determining from an execution log output of the at least one task a set of metadata and a set of log levels of log records of the at least one task; executing a further task; logging execution outputs of the further task according to the determined set of metadata and associated set of log levels.

In an aspect according to the present invention, a computer implemented method for logging tasks in a computer system, comprises: executing at least one task at the computer system; determining from an execution log output of the at least one task a set of log metadata and a set of log levels of log records of the at least one task; executing a further task; and logging execution outputs of the further task according to the determined set of log metadata and associated set of log levels.

In a related aspect, the log metadata of the log record includes comprising values of one or more logging attributes, the logging attribute comprising an attribute selected from the group of: a type of the task from which the log record originates, a component of the computer system from which the log record originates, and a type of the log record.

In a related aspect, the logging of the execution outputs comprises: storing a log record whose log metadata and log level match a specific log metadata of the set of log metadata and the associated log level.

In a related aspect, the method further comprising: determining a similarity between the log metadata of the log record to be stored and the determined set of log metadata; and comparing the log level of the most similar log metadata with the log level of the log record to be stored and performing the storage of the record based on the comparison result.

In a related aspect, the method determining comprising: creating and storing at least one profile for the at least one task, the profile comprising an entry per log record, wherein the entry comprises the log metadata and the log level of the log record.

In a related aspect, the method further comprising:
a. activating at least one profile; and
b. wherein the logging of the execution output comprises: determining whether one or more previously stored profiles are actives and in response to determining that one or more stored profiles are active, performing the logging of the execution output based on the active profiles.

In a related aspect, the logging of execution outputs comprising:
a. receiving a request to create a log record of the further task; and
b. checking whether the log record satisfies any of the active profiles; and upon success, storing the log record.

In a related aspect, the checking comprising: performing a logical expression combining log metadata of the log record and the log metadata of the active profiles.

In a related aspect, wherein the determining is performed until a stop condition is fulfilled, wherein the stop condition is any one of: a time-based stop condition, a received explicit stop, a space-driven stop condition, and the task is done.

In a related aspect, wherein the determining is performed until a stop condition is fulfilled, the method further comprising:
a. performing an intermediate storage of the profile in an in-memory during the determining step; and
b. persisting the storage of the profile after the stop condition is fulfilled.

In a related aspect, wherein the determining is performed automatically upon end of a warmup phase of the computer system, and wherein the warmup phase is a predefined time period or a time period for reaching a certain code point.

In a related aspect wherein the determining is performed in a test run before the computer system is deployed; or in response to a demand by a user after the computer system has been deployed.

In a related aspect, the method further comprising:
a. creating another profile, referred to as background profile, for background tasks of the computer system; and
b. subtracting entries of the background profile from the at least one profile, wherein the logging of the execution outputs is performed based on the subtracted profile.

In a related aspect, the method comprising:
a. creating other profiles for other types of tasks of the computer system;
b. receiving a request to execute a workload comprising tasks being a combination of two or more types of said types;
c. combining the profiles associated with said two or more types, thereby rejecting duplicate entries;
d. executing the received task; and
e. the logging of the execution output of the received task being based on the combined profile.

In a related aspect, the method further comprising combining the profiles by applying a set logical operation.

In a related aspect, wherein the execution of the further task and the logging is performed for debugging the further task in response to an execution error in an initial execution of the further task.

In a related aspect, the method further comprising: receiving a request to debug the further task via an application programming interface; and in response to receiving the request performing the execution of the further task and the logging.

In a related aspect, wherein the determining step is performed at runtime after a compiled source code of the at least one task and the further task has been deployed to the computer system.

In a related aspect, in response to determining that the source code has changed, maintaining the at least one profile for logging further tasks.

In another aspect according to the present invention, a computer program product comprising a computer includes a computer-readable storage medium having computer-readable program code embodied therewith. The computer-readable program code executable by the computer to: execute at least one task at the computer system; determine from an execution log output of the at least one task a set of log metadata and a set of log levels of log records of the at least one task; executing a further task; and log execution outputs of the further task according to the determined set of log metadata and associated set of log levels.

In another aspect according to the present invention, a system comprises:
a. a computer system including a computer processor, a computer-readable storage medium, and program instructions stored on the computer-readable storage medium and being executable by the processor, to cause the computer system to:
b. execute at least one task at the computer system; determine from an execution log output of the at least one task a set of log metadata and a set of log levels of log records of the at least one task; executing a further task; and log execution outputs of the further task according to the determined set of log metadata and associated set of log levels.

BRIEF DESCRIPTION OF THE DRAWINGS

In the following embodiments of the invention are explained in greater detail, by way of example only, making reference to the drawings in which.

DETAILED DESCRIPTION

Figure 1:
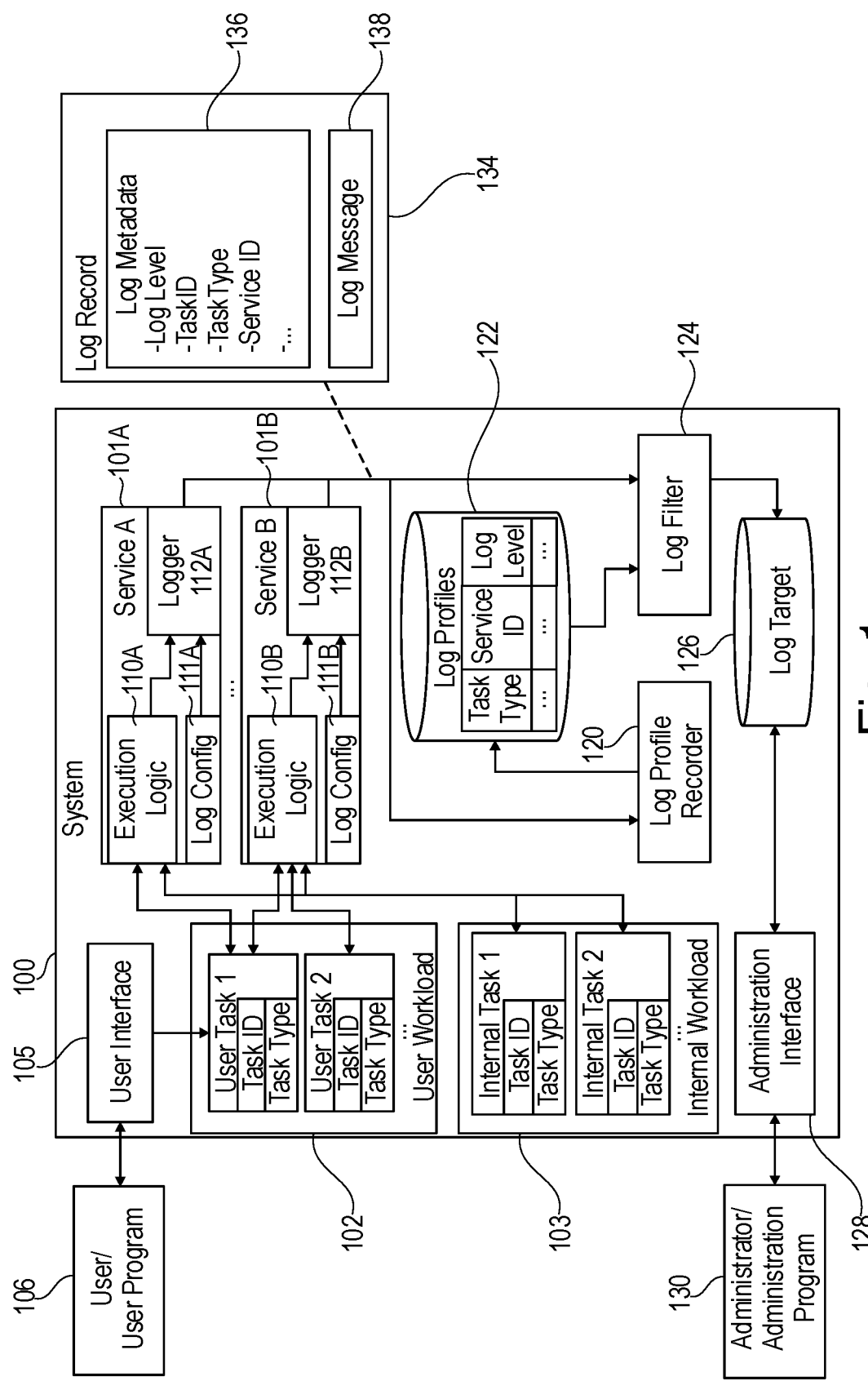
FIG. 1 depicts a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The computer system may be configured to execute workloads. A workload may comprise one or more tasks. The at least one test task may be of a workload. A task may, for example, be a program. The task may implement an action or a series of actions that a user wants to perform. The term "user" may refer to an entity e.g., an individual, a computer, or an application executing on a computer. The task may have a type (task type). The task type may, for example, be a user task, system task etc. For example, the task may be a query task for querying tables or a load task for loading tables in a database. The execution of a task may involve or require components of the computer system which enable implementation and execution of the task. The component may, for example, be a software and/or hardware component of the computer system. For example, components of the computer system for enabling execution of a query may comprise a disk for storing files, query optimizer, transaction logger etc.

The components may generate log records that may record events, activity and transactions in the computer system. For example, a log record with log level DEBUG may stem from a method M of class C in package P. The log record may comprise a log message and log metadata. The log records may be stored, for example, as entries within log files. For example, each entry of the log file may comprise values of attributes representing the log message and log metadata. The information within log files may be utilized by personnel that support the computer system to diagnose hardware and software problems within the computer system.

Logging of the component may be configured with different verbosity using the log level to reduce generated log volumes and the performance overhead for generating log records. The log level of a log record may indicate severity of the information in the log message of the log record. The severity may, for example, indicate the degree of impact on a running program. The severity may be one of the following: informational messages which provide guidance and feedback about something that has happened in the system that may be important, warning messages may call attention to an exception condition, wherein the condition might not be an error, but could cause problems if not resolved and error messages may indicate that an action cannot be completed because of a user or system error. For example, the log levels may be ranked according to their severities e.g., the log level representing error messages may be the highest level and the log level representing debug messages may be the lowest level.

The present subject matter may be advantageous as it may improve the logging dependent on the task being executed. The determining step may provide log settings indicating log metadata and associated log levels. The log settings may be used to reduce the log volumes. For example, for a given task being executed, only log records of the components involved in the given task and which are indicated by the determined log settings may be stored. This may indeed be advantageous, because for specific customer-driven workloads, only a subset of all components of the computer system may be involved.

The present subject matter may provide a secure logging method; it may hide log settings to avoid that the component structure is exposed to external users. The present subject may allow to automatically calibrate a logger with custom workload-specific profiles without internal knowledge about the system architecture or operation. For example, a usual user, either the customer or even technical support engineers, may lack the detailed knowledge which components are involved for a particular task type. All that a user knows is the workload that was executed and caused a problem. The present subject matter may provide an interface e.g., an application programming interface (API) that uses this input that can be controlled by the user in order to derive the log settings. So, the log settings may easily be changed without impacting something that the user may know about internals of the computer system.

According to one embodiment, the log metadata of the log record comprises values of one or more logging attributes. The logging attribute comprises any one of: a type of the task from which the log record originates, a component of the computer system from which the log record originates and a type of the log record. The type of log record may, for example, indicate whether it is a regular message or an exception. For example, for each log record, a pair of (log metadata, log level) may be provided. An example log metadata may comprise: task type=table query, ID=P.C.M. The determined set of log metadata may or may not have the same logging attributes. In one example, a log metadata of log record R1 may comprise values of task type and component ID while the log metadata of another log record R2 may comprise values of task type, component ID and type of log record. This may be advantageous as some log records may not have values for all logging attributes. In another example, a set of logging attributes may be predefined for all log records, wherein in case a logging attribute of that set cannot be evaluated for a log record a dummy value may be assigned to that logging attribute. This may be advantageous as it may enable a consistent processing of the set of log metadata.

According to one embodiment, the logging of the execution outputs comprises: storing each log record whose log metadata and log level match a specific log metadata of the set of log metadata and the associated log level respectively. In one example, the log record may be stored if the log metadata of the log record comprises logging attributes of the specific log metadata and in addition the log level of the log record is the same as the log level associated with said specific log metadata. In another example, the log record may be stored if the log metadata of the log record comprises logging attributes of the specific log metadata and in addition the log level of the log record is equal or higher than the log level associated with said specific log metadata. This embodiment may provide an accurate and controllable logging process through matching.

According to one embodiment, the method further comprises: determining a similarity between the log metadata of the log record to be stored and the determined set of log metadata; in response to determining, using a matching rule, that the log metadata of the log record to be stored matches one log metadata of the set of log metadata, comparing the log level of the one log metadata with the log level of the log record to be stored and performing the storage of the log record based on the comparison result.

The similarity between the log metadata of the log record to be stored and the determined set of log metadata may be performed by comparing the log metadata of the log record to be stored with each log metadata of the determined set of log metadata. The comparison may, for example, be performed by individually comparing values the logging attributes of the two compared log metadata and determining for each logging attribute $ATT_i$ (i=1, ... n, n being the number of logging attributes) of the logging attributes an individual similarity score $S_{att}^i$ indicative of a comparison result of the values of the attribute $ATT_i$. The similarity scores $S_{att}^i$ may be combined for determining an (overall) similarity score $S_{meta}$ which is indicative of the similarity between the two compared log metadata. The combination of the individual similarity scores may, for example, be the sum of the individual similarity scores, $S_{meta}=\Sigma_{i=1}^{nS} S_{att}^i$. In another example, the combination of the individual similarity scores may be the weighted sum of the individual similarity scores using weights $w_i$ assigned to the logging attributes, $S_{meta}=\Sigma_{i=1}^{n} w_i \times S_{att}^i$ e.g., the task type may have a higher weight compared to the component ID etc. The weighted sum may be advantageous as it may enable to exclude some logging attributes when performing the matching e.g., the matching rule may indicate that the matching is to be performed using the task type attribute only. The weighted sum may also enable to put more emphasis on a logging attribute compared to the others. The matching rule may, for example, require that the score $S_{meta}$ is higher than a predefined threshold.

The matching rule may indicate how individual logging attributes of the log record and of the pre-determined log metadata can be matched to provide the individual similarity scores. The following example describes the matching for the logging attribute representing a component that originates the log record. The origin of a log request inside the code may be part of the requests metadata. For example, a log request with level DEBUG may stem from method M of class C in package P. In this case, the component originating the log record may be defined as a hierarchy of subcomponents P, C and M and its component ID may be P.C.M. The matching rule may be adapted for the logging attribute which represents the component ID in order to implement an uncertainty radius. For example, to implement the uncertainty radius, instead of having an exact match of the component ID, P.C.M, the matching rule may be broadened, e.g., by allowing any method from that class C (a) that is any log metadata that has component ID starting with P.C. may be a matching or by allowing any class within that package P (b). So, a profile still matches requests if the class was refactored, e.g., by renaming methods (a) or renaming the class (b). More example uncertainty criteria may also be defined by combining several metadata properties.

In another example, the similarity between the log metadata of the log record to be stored and the determined set of log metadata may be performed by using a machine learning model that can classify the log metadata of the log record to be stored as being storable or not storable. The machine learning model may, for example, be trained to perform the classification using the set of log metadata and set of log levels obtained by the determining step.

According to one embodiment, the determining step comprises: creating and storing at least one profile for the at least one task. Each profile of the at least one profile comprises the log metadata and the log levels of the associated task. For example, for each executed task type, a profile may be stored and created. In this case, the profile may be tagged or flagged to indicate the task type associated with the profile. Alternatively, the task type may be one of the logging attributes in the profile. In another example, for each executed task, a profile may be created and stored. In another example, a single profile may be created and stored for all executed tasks. The determining step may thus enable profile recording. The profile may be implemented as a mapping from log metadata, such as task types and identifiers for services/components that executed the tasks, to a log level. The profile may, for example, be in the form of an XML document.

Using the profiles may be advantageous as it may simplify access to required log levels for given task types. In addition, it may be possible to significantly refine the granularity of such log settings. This is because, the profiles can be automatically configured based on codes, wherein a code may use much more fine-grained identifiers compared to manual definition of log settings because. Thereby, logging overheads as well as the amount of log records that will be generated by the system may be reduced, which may also lower manual analysis efforts for analysing problems with the help of the log.

According to one embodiment, the method further comprises: activating the at least one profile, wherein the logging of the execution output comprises: determining whether one or more stored profiles are active and in response to determining that one or more profile are active, performing the logging of the execution output based on the active profiles.

For example, several profiles may be created for different task types according to the present subject matter. Before logging the execution output of a given task, it may be checked whether stored profiles are active, and the logging may be performed in accordance with the active profiles. For example, if no profile is active, the logging may be performed unconditionally so that every log record may be stored.

According to one embodiment, the logging of execution outputs comprises: receiving a request to create a log record of the further task, checking whether the log record satisfies any of the active profiles, and upon success, storing the log record. For example, for each log record to be logged it may be checked whether the component that generates the log record, the content of the log record, and the task of the log record match the content of the entry associated with said task type in the active profiles. For example, the log request may be the following call "logger.info("hello")". When executed, this call may, for example, generate a formatted log record as follows: <TIMESTAMP> <COMPONENT><TASK-ID><TASK-TYPE><SOURCE-FILE-LOCATION>INFO: "hello". The present method may process the log request, e.g., before it is executed, to derive the log metadata associated with the log record of the log request such as the COMPONENT, TASK-ID etc. and the log level "INFO". This derived metadata and the log level may be compared with the content of the profiles to decide whether to store or not store the log record of the call.

According to one embodiment, the checking comprises: performing a logical expression combining log metadata of the log record and the log metadata of the active profiles. For example, all available profiles and any combination thereof, e.g., combined via logical expressions, may be checked for matching with the log record. This may enable profile manipulations that simplify the logging process.

According to one embodiment, the determining step is performed until a stop condition is fulfilled, wherein the stop condition is any one of: a time-based stop condition, a received explicit stop, a space-driven stop condition, and the task is done. For example, in response to a start-recording trigger condition, metadata of all log records that are generated while the system is running may be recorded until the stop condition is fulfilled.

According to one embodiment, the method further comprises: performing an intermediate storage of the profile in an in-memory during the determining step; and persisting the storage of the profile after the stop condition is fulfilled.

According to one embodiment, the determining step is performed automatically upon end of a warmup phase of the computer system, wherein the warmup phase is a predefined time period or a time period for reaching a certain code point.

According to one embodiment, the determining step is performed in a test run before the computer system is deployed; or in response to a demand by a user after the computer system has been deployed. In one example, the determining step may be bound to the start of a particular task type, or based on some log request metadata, e.g., if the entry type represents an error or a warning.

The determining step may be triggered via dedicated system interfaces, e.g., administration APIs. In particular, this may be done in test runs before the system is deployed or on demand by a customer after the system has been deployed before triggering a particular workload whose logging behaviour should be trained. The determining step may be triggered under test-specific workload conditions when particular functions are validated for training function-specific profiles. The determining step may be triggered without executing particular workloads for training internal workload profiles. In addition to explicitly triggering the determining step, the system may schedule the determining step automatically, e.g., after a warmup phase (time-based or after reaching a certain code point), in order to reduce profiling for code paths that are not representative for the regular system operation mode. Further, recording may be bound to the lifetime of particular tasks, e.g., executing a query in a database system, that have clearly defined start and end conditions.

According to one embodiment, the method further comprises: creating another profile, referred to as background profile, for background tasks of the computer system; subtracting entries of the background profile from the at least one profile; wherein the logging of the execution outputs is performed based on the subtracted profile.

This embodiment may allow filtering log records that have been generated by background tasks. For example, the computer system may be an appliance-like system, like the IBM® Db2 Analytics Accelerator (IDAA). The computer system may implement internal maintenance tasks that generate additional load on the system's components. This embodiment may prevent those extra logs and, thus, simplifies the log correlation task in support situations and reduces logging overheads using the combined profile.

According to one embodiment, the method further comprises: creating other profiles for other types of tasks of the computer system, receiving a request to execute a workload comprising tasks of two or more types of said types, combining the profiles associated with said two or more types, thereby rejecting duplicate entries, executing the received workload, wherein the logging of the execution output of the received workload is based on the combined profile. The profiles associated with said two or more types are combined and duplicated entries are removed from the combined profile. This may save resources as it may process a single deduplicated profile. This embodiment may also particularly be advantageous if the task type associated with a profile is not encoded as an attribute in the log metadata of the profile.

According to one embodiment, the method further comprises combining the profiles by applying a set logical operation.

Log profiles may be generated for different use cases of the system, e.g., executing queries, loading data into or removing data from database tables, running performance analysis tasks, managing user privileges, etc. in case of database management systems. Users of the system may also combine multiple use cases in their workloads, e.g., by parallel execution of such tasks. Further, the system itself may execute background tasks autonomously, e.g., data reorganizations, health checks, performance monitoring, etc. that are not directly visible to users of the system and may not be controlled directly. Therefore, a lot of combinations exist that may lead to problems when profiles are recorded. Many logging components may be involved in combined use cases, which may lower the efficiency of the log record filtering process once a profile is applied. This problem can be addressed by recording profiles for multiple workloads and combining them e.g., with set-oriented logical operations. This mechanism may allow to derive profiles based on existing recorded profiles without the need to record additional ones. This may particularly be useful when a particular workload is hard to model or when it is interfered by other tasks that are hard to control. This logical combination of log profiles may be calculated statically when such a derived profile is created or dynamically during the filtering process.

For example, a profile may be recorded for a particular time frame while the system is running without user-driven tasks, e.g., after the warmup phase where probably most of the components will be involved, in order to record a profile corresponding to background operations that are executed automatically and would lead to "noise" in the log output if their rather uninteresting log records would be included in a profile of a user-driven operation. This background task profile can be "subtracted" from all subsequently recorded user workload-specific profiles by applying a set complement operation on the profiles' component or task ID lists. This may also be applied for combining user-driven workload profiles, e.g., union profiles for loading a database table and removing data from a table but excluding query execution.

According to one embodiment, the execution of the further task and the logging is performed for debugging the further tasks in response to an execution error in an initial execution of the further task.

According to one embodiment, the method further comprises: receiving a request to debug the further task via an application programming interface; and in response to receiving the request performing the execution of the further task and the logging.

According to one embodiment, the determining step is performed at runtime after a compiled source code of the at least one task has been deployed to the computer system.

This embodiment may enable a dynamic creation of the profiles. This may be advantageous compared to a static definition of the profiles for the following reasons. The term "static" refers to hard-coded profile settings that a developer has defined inside a product code at development time. That is, there is special code that lists log configurations for particular components/task types. Since this is part of the compiled source code, such a pre-defined profile cannot be changed at runtime. This configuration may be incorrect, is easily forgotten during development of new features, cannot be dynamically extended, and may not reflect user-defined complex workloads. Further, components are shared between user-driven tasks and internal maintenance tasks. That is, once a log configuration is changed for one of the components, the log may be flooded with irrelevant information from internal background jobs, which increases the probability that important error information is lost due to rolling log overwrite or simply overseen in the large amount of log data. Further, there may be no need to adapt static profiles in case of code changes anymore, which is easily forgotten.

FIG. 1 illustrates an example of a computer system. The illustration in FIG. 1 is a functional diagram. The computer system 100 comprises services 101A and 101B. Only two services are shown for simplification of the description, but it is not limited to. The services 101A-B may be configured to process workloads 102 and 103 at the computer system 100. The workloads may comprise user workload 102 and internal workload 103. The user workload may, for example, be received from a user 106 via a user interface 105 of the computer system 100. Each of the workloads 102 and 103 may comprise one or more tasks. Each task may be associated with information indicating a task ID and a task type of the task.

Each of the services 101A-B may comprise an execution logic, a log config unit, and a logger. For example, the service 101A comprises the execution logic 110A, the log config unit 111A, and the logger 112A. The service 101B comprises the execution logic 110B, the log config unit 111B and the logger 112B. The execution logic 110A-B of each of the services 101A-B may enable to execute the task assigned to the service 101A-B. The log config unit 111A may provide log configurations according to which log records may be provided by the logger 112A-B. The logger 112A-B of each of the services 101A-B may generate log records 134 comprising task execution outputs. Each of the log records 134 may, for example, comprise log metadata 136 and one or more log messages 138. The log metadata 136 may comprise values indicating the task ID and the task type of the task associated with the log record, a service ID of the service 101A-B that executed the task and log level. By way of example, log level of highest severity may be indicative of an event that has dramatic impact on the computer system 100, for instance, this level event might cause the computer system 100 to crash if not immediately corrected. Log level of second highest severity may indicate a warning message, e.g., disk space is reaching a maximum. Log level of lowest severity may be informational and may, for example, indicate the execution time, number of transactions, cache misses, etc.

The log metadata 136 of each of log records 134 may be used by a log profile recorder 120 of the computer system 100 to create a log profile e.g., per task type. Each of the log profiles 122 comprises values of attributers such as task type, service ID and log level. The computer system 100 may further comprise a log filter 124. The log filter 124 may be configured to select the log records 134 to be stored in the log target storage 126 of the computer system 100 based on the log profiles 122. For example, the log filter 124 may use the log profiles to check whether the (meta)data that is available in a log request matches the metadata in the log profiles. If it matches, the logger 112A-B may process the request and generates the actual log record. If not, the log request may be ignored. An administrator 130 may access the selected and stored log records in the log target storage 126 via an administrator interface 128 of the computer system 100.

Figure 2:
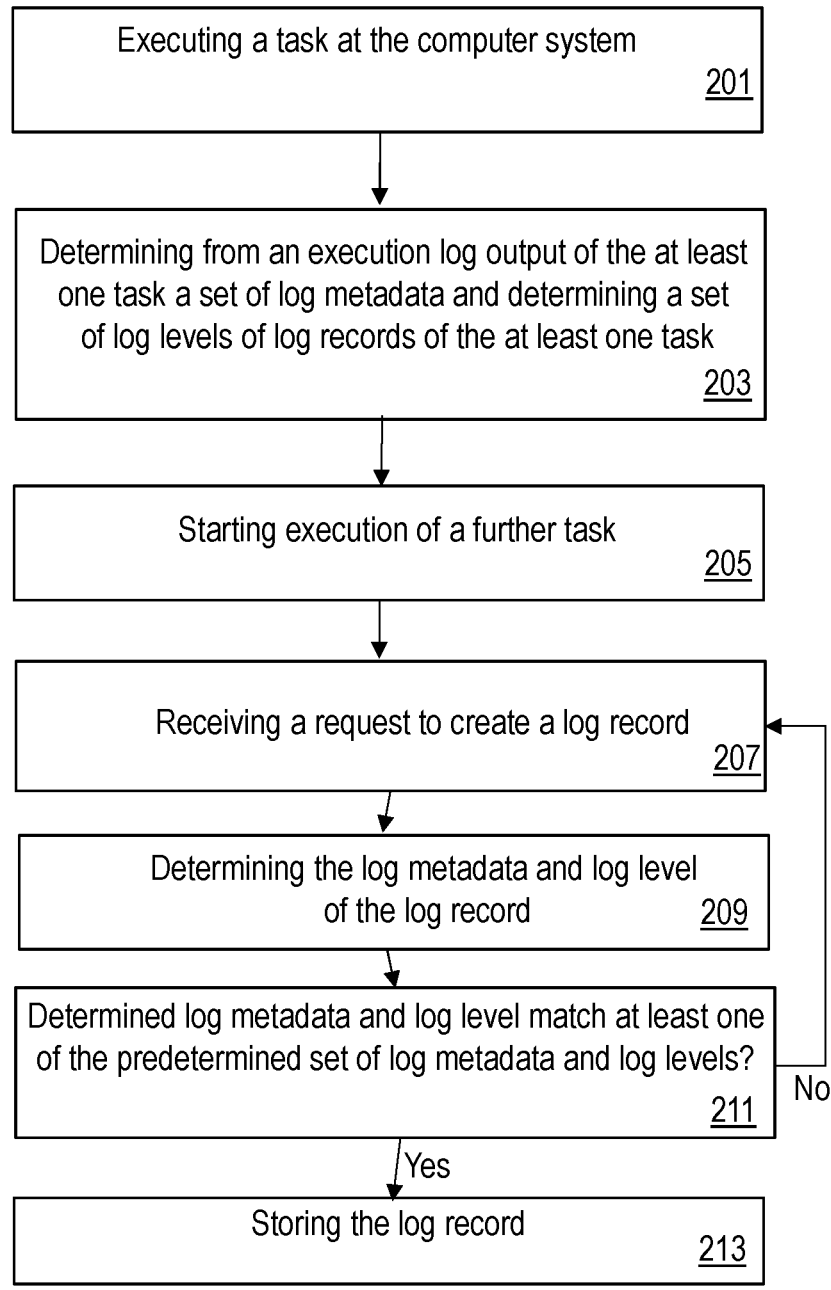
FIG. 2 is a flowchart of a method for logging tasks in a computer system in accordance with an example of the present subject matter.

FIG. 2 is a flowchart of a method for logging tasks in a computer system. For the purpose of explanation, the method described in FIG. 2 may be implemented in the system illustrated in FIG. 1 but is not limited to this implementation. The method of FIG. 2 may, for example, be performed by the computer system 100.

N tasks may be executed in step 201 at the computer system 100, where N is an integer higher than or equal to one. For example, a workload may be executed in step 201, wherein execution of the workload comprises execution of the N tasks. During execution of the N tasks, execution log output may be generated by components involved in the N tasks. It may be determined in step 203 from the execution log output of the N tasks, values of logging attributes. The values of logging attributes may be evaluated for each log record that is provided by execution of the N tasks. For example, a predefined set of logging attributes may be defined or provided, and for each log record, all the set of logging attributes may be evaluated. In case a logging attribute cannot be evaluated, a dummy value may be assigned to it. The set of logging attributes may, for example, comprise a task type of the task from which the log record originates, and ID of the component that originates the log record, the type of the log record etc. In addition, the log level associated with each log record may be determined. This may be performed by parsing the execution output of the N tasks or parsing the code that implements the N tasks to find the log level. Generating the set of log metadata and associated log levels by executing the tasks instead of reading the static codes may be advantageous for the following reasons. The static code analysis may miss the runtime information part, the task information in particular. Components may be shared between tasks. In a database case, for example, a database connection needs to be created for loading tables and for processing queries. So just knowing the source code location inside the connection class may not convey any information how this place has been reached and to which user request it belonged to. Thus, a profile that is recorded at runtime (while the N tasks are executed) can consider such information and may reduce the overall log volume for independent stuff.

Steps 201 to 203 may, for example, be performed a priori e.g., offline, before deploying the computer system. In one example, steps 201 to 203 may be repeated for different workloads. Hence, the execution of steps 201 to 203 may result in a set of M entries, wherein each entry of the M entries comprises values of the set of logging attributes and the log level. In one example, the M entries may be stored in a profile. In another example, the M entries may be stored in multiple profiles assigned to different task types.

The results of steps 201 to 203 may advantageously be used to log subsequent tasks to be executed on the computer system. For example, the execution of a further task may be triggered in step 205. During execution of the further task, steps 207 to 213 may be performed for each received request to create a log record. In step 207, a request to create a log record may be received. The values of the set of logging attributes (named META) may be determined in step 209 for the received log request. In case a logging attribute cannot be evaluated, a dummy value may be assigned to it. In addition, a log level (named LEV) of the log record may be determined in step 209 from the received request. It may be determined in step 211 whether the determined log metadata META and log level LEV of the log record match at least one of the M entries. The matching may, for example, be performed by comparing log metadata of each entry of the M entries with the log metadata META. For example, the comparison may be performed by computing the similarity score $S_{meta}$ as described herein. In another example, the comparison may be performed to find an exact match between the log metadata META and log metadata of an entry of the M entries. In case of a successful match of the log metadata META with an entry X of the M entries, the log level LEV may be compared with the log level of the entry X. The comparison may be successful if the log level LEV is equal to or higher than the leg level of the entry X. If the comparison is successful, the log record may be stored.

Steps 205 to 213 may, for example, be performed for debugging the further task in response to an execution error in a previous execution of the further task.

Figure 3:
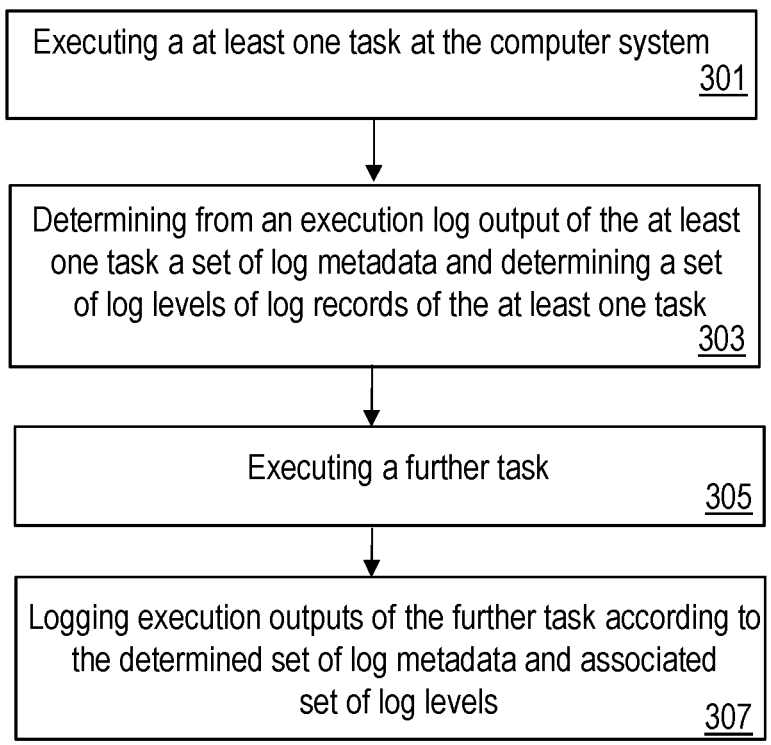
FIG. 3 is a flowchart of a method for logging tasks in a computer system in accordance with an example of the present subject matter.

FIG. 3 is a flowchart of a method for logging tasks in a computer system. For the purpose of explanation, the method described in FIG. 3 may be implemented in the system illustrated in FIG. 1 but is not limited to this implementation. The method of FIG. 3 may, for example, be performed by the computer system 100.

N tasks may be executed in step 301 at the computer system 100, where N is an integer higher than or equal to one. For example, a workload may be executed in step 301, wherein execution of the workload comprises execution of the N tasks. During execution of the N tasks, execution log output may be generated by components involved in the N tasks. It may be determined in step 303 from the execution log output of the N tasks values of logging attributes. The values of logging attributes may be evaluated for each log record that is provided by execution of the N tasks. For example, a predefined set of logging attributes may be defined or provided, and for each log record, all the set of logging attributes may be evaluated. In case a logging attribute cannot be evaluated, a dummy value may be assigned to it. The set of logging attributes may, for example, comprise a task type of the task from which the log record originates, and ID of the component that originates the log record, the type of the log record etc. In addition, the log level associated with each log record may be determined. This may be performed by parsing the execution output of the N tasks or parsing the code that implements the N tasks to find the log level.

A further task may be executed in step 305. Execution outputs of the further task may be logged in step 307 according to the determined set of log metadata and associated set of log levels.

Figure 4:
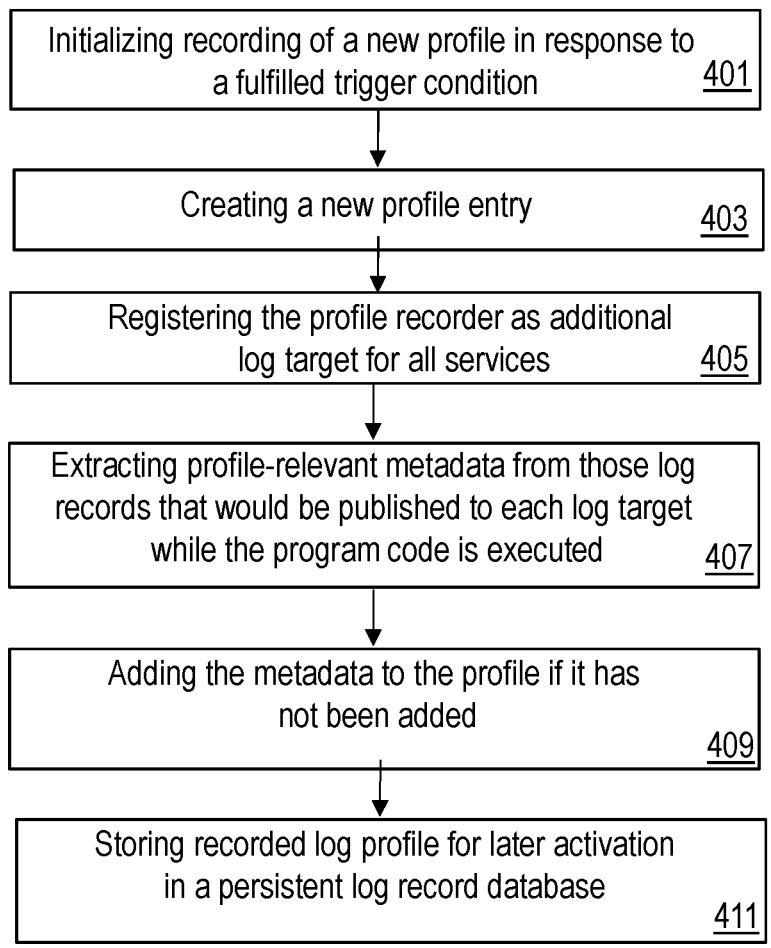
FIG. 4 is a flowchart of a method for recording log profiles in accordance with an example of the present subject matter.

FIG. 4 is a flowchart of a method for logging tasks in a computer system. For the purpose of explanation, the method described in FIG. 5 may be implemented in the system illustrated in FIG. 1 but is not limited to this implementation. The method of FIG. 5 may, for example, be performed by the computer system 100.

Recording of a new profile may be initialized in step 401 in response to a fulfilled trigger condition. The generation/recording of a new profile may be triggered via dedicated system interfaces, e.g., administration APIs. In particular, this may be done: In test runs before the system is deployed; under test-specific workload conditions when particular functions are validated for training function-specific profiles; without executing particular workloads for training internal workload profiles; or on demand by a customer after the system has been deployed before triggering a particular workload whose logging behaviour should be trained.

A new profile entry may be created in the (in-memory) profile database in step 403. The profile recorder may be registered in step 405 as additional log target for all services. Until recording is done (e.g., time-based stop, explicit stop, space-driven stop, to be profiled task done, . . . ), profile-relevant metadata may be extracted in step 407 from those log records that would be published to each log target, while the program code is executed. The metadata may be added in step 409 to the profile if it has not been added yet and the log record itself may be omitted to limit overheads for recording. The recorded log profile may be stored in step 411 for later activation, e.g., for debugging purposes, in a persistent log record database.

Figure 5:
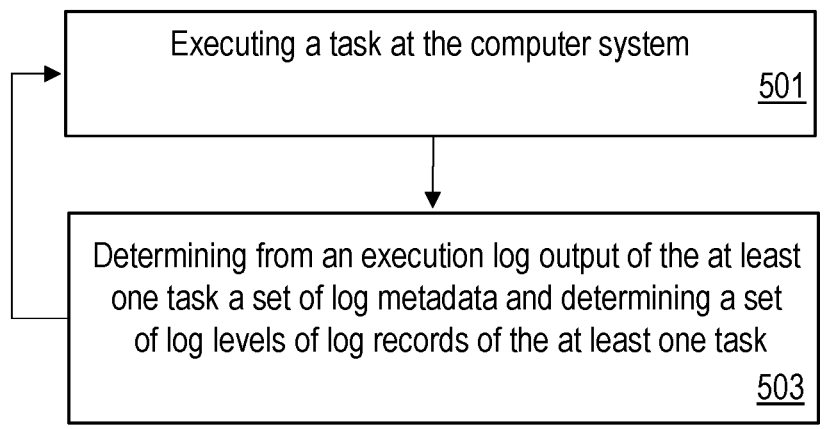
FIG. 5 is a flowchart of a method for recording log metadata and associated log levels in accordance with an example of the present subject matter.

FIG. 5 is a flowchart of a method for recording log metadata and associated log levels in accordance with an example of the present subject matter. For the purpose of explanation, the method described in FIG. 5 may be implemented in the system illustrated in FIG. 1 but is not limited to this implementation. The method of FIG. 5 may, for example, be performed by the computer system 100.

N tasks may be executed in step 501 at the computer system 100, where N is an integer higher than or equal to one. For example, a workload may be executed in step 501, wherein execution of the workload comprises execution of the N tasks. During execution of the N tasks, execution log output may be generated by components involved in the N tasks. It may be determined in step 503 from the execution log output of the N tasks values of logging attributes. The values of logging attributes may be evaluated for each log record that is provided by execution of the N tasks. For example, a predefined set of logging attributes may be defined or provided, and for each log record, all the set of logging attributes may be evaluated. In case a logging attribute cannot be evaluated, a dummy value may be assigned to it. The set of logging attributes may, for example, comprise a task type of the task from which the log record originates, and ID of the component that originates the log record, the type of the log record etc. In addition, the log level associated with each log record may be determined. This may be performed by parsing the execution output of the N tasks or parsing the code that implements the N tasks to find the log level.

Steps 501 to 503 may be repeated for different workloads. Hence, the execution of steps 501 to 503 may result in a set of M entries, wherein each entry of the M entries comprises values of the set of logging attributes and the log level. In one example, the M entries may be stored in a profile. In another example, the M entries may be stored in multiple profiles assigned to different task types.

Figure 6:
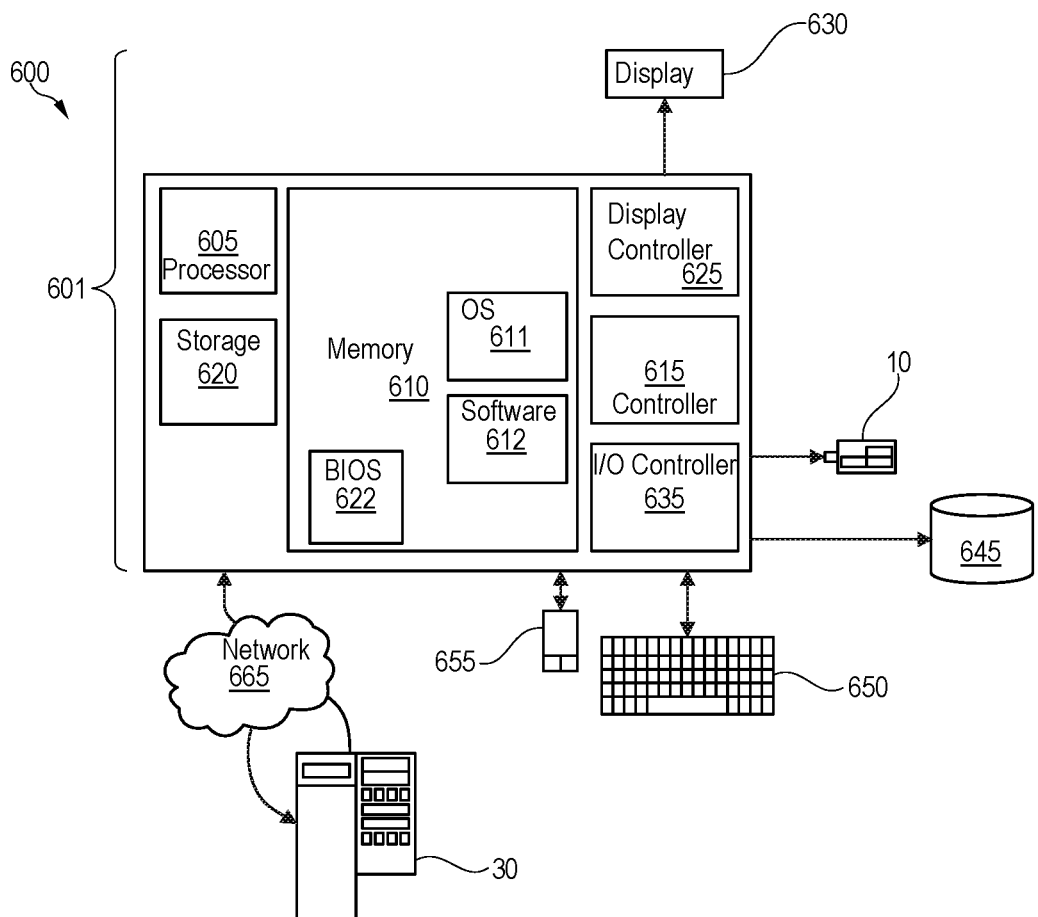
FIG. 6 represents a computerized system, suited for implementing one or more method steps as involved in the present subject matter.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612 e.g. instructions to manage databases such as a database management system.

The software in memory 610 shall also typically include a suitable operating system (OS) 611. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as Wi-Fi, WiMAX, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The subject matter of the present disclosure may comprise the following.

In one embodiment, a computer implemented method for logging tasks in a computer system can comprise: executing at least one task at the computer system; determining from an execution log output of the at least one task a set of log metadata and a set of log levels of log records of the at least one task; executing a further task; logging execution outputs of the further task according to the determined set of log metadata and associated set of log levels.

In one example, the method can include the log metadata of the log record comprising values of one or more logging attributes, and the logging attribute comprising any one of: a type of the task from which the log record originates, a component of the computer system from which the log record originates and a type of the log record.

In one example, the method of any of the preceding examples, wherein the logging of the execution outputs comprises: storing a log record whose log metadata and log level match a specific log metadata of the set of log metadata and the associated log level.

In one example, the method can further include determining a similarity between the log metadata of the log record to be stored and the determined set of log metadata; comparing the log level of the most similar log metadata with the log level of the log record to be stored and performing the storage of the record based on the comparison result.

In one example, the method of any of the preceding clauses 1 to 4, the determining comprising: creating and storing at least one profile for the at least one task, the profile comprising an entry per log record, wherein the entry comprises the log metadata and the log level of the log record.

In one example, the method further including activating the at least one profile; wherein the logging of the execution output comprises: determining whether one or more previously stored profiles are actives and in response to determining that one or more stored profiles are active, performing the logging of the execution output based on the active profiles.

In one example, the logging of execution outputs includes receiving a request to create a log record of the further task; and checking whether the log record satisfies any of the active profiles; and upon success, storing the log record.

In one example, the checking including performing a logical expression combining log metadata of the log record and the log metadata of the active profiles.

In one example, the determining is performed until a stop condition is fulfilled, wherein the stop condition is any one of: a time-based stop condition, a received explicit stop, a space-driven stop condition, and the task is done.

In one example, the determining is performed until a stop condition is fulfilled, the method further comprising: performing an intermediate storage of the profile in an in-memory during the determining step; and persisting the storage of the profile after the stop condition is fulfilled.

In one example, the determining is performed automatically upon end of a warmup phase of the computer system, wherein the warmup phase is a predefined time period or a time period for reaching a certain code point.

In another example, the determining is performed in a test run before the computer system is deployed; or in response to a demand by a user after the computer system has been deployed.

In another example, the one or more methods of the present disclosure can include creating another profile, referred to as background profile, for background tasks of the computer system; and subtracting entries of the background profile from the at least one profile; wherein the logging of the execution outputs is performed based on the subtracted profile.

In one example, the one or methods of the present disclosure can include creating other profiles for other types of tasks of the computer system; receiving a request to execute a workload comprising tasks being a combination of two or more types of said types; combining the profiles associated with said two or more types, thereby rejecting duplicate entries; executing the received task; the logging of the execution output of the received task being based on the combined profile.

In one example, a method can further include combining the profiles by applying a set logical operation.

In one example, the execution of the further task and the logging is performed for debugging the further task in response to an execution error in an initial execution of the further task.

In one example, a method can include receiving a request to debug the further task via an application programming interface; and in response to receiving the request performing the execution of the further task and the logging.

In one example, the determining step is performed at runtime after a compiled source code of the at least one task and the further task has been deployed to the computer system.

In one example, in response to determining that the source code has changed, a method can include maintaining the at least one profile for logging further tasks.

The present invention may be a system, a method, and/or a computer program product at any possible technical detail level of integration. The computer program product may include a computer readable storage medium (or media) having computer readable program instructions thereon for causing a processor to carry out aspects of the present invention. A 'processor' as used herein encompasses an electronic component which is able to execute a program or machine executable instruction or computer executable code. The processor may for instance be a multi-core processor. A processor may also refer to a collection of processors within a single computer system or distributed amongst multiple computer systems. The computer executable code may be executed by multiple processors that may be within the same computing device or which may even be distributed across multiple computing devices.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for logging tasks in a computer system, comprising:
   executing at least one task at the computer system;
   determining, from an execution log output of the at least one task, a set of log metadata and an associated set of log levels of log records of the at least one task;
   executing a further task at the computer system;
   logging execution outputs of the further task according to the determined set of log metadata and the associated set of log levels of the log records of the at least one task, wherein the logging of the execution outputs of the further task includes storing a log record whose log metadata and log level match a specific log metadata of the set of log metadata and an associated log level of the associated set of log levels of the log records of the at least one task;
   comparing the associated set of log levels of the log records of the at least one task with the log level of the log record to be stored; and
   performing the storage of the log record based on a successful result of the comparison.

2. The computer implemented method of claim 1, wherein a log metadata of a log record comprises values of one or more logging attributes, and wherein a logging attribute comprises an attribute selected from the group consisting of: a type of the at least one task from which the log record originates, a component of the computer system from which the log record originates, and a type of the log record.

3. The computer implemented method of claim 1, further comprising:
   determining a similarity between the log metadata of the log record to be stored and the determined set of log metadata;
   comparing a log level of a most similar log metadata with the log level of the log record to be stored; and
   performing the storage of the log record based on a successful result of the comparison.

4. The computer implemented method of claim 1, wherein the determining comprises:
   creating and storing at least one profile for the at least one task, wherein the at least one profile comprises an entry per log record, and wherein the entry comprises a log metadata and a log level of the log record.

5. The computer implemented method of claim 4, further comprising:
   activating the at least one profile, wherein the logging of the execution outputs of the further task comprises determining whether one or more previously stored profiles are active and, in response to determining that the one or more previously stored profiles are active, performing the logging of the execution outputs of the further task based on the one or more active profiles.

6. The computer implemented method of claim 5, wherein the logging of the execution outputs of the further task comprises:
   receiving a request to create a log record of the further task;
   checking whether the log record of the further task satisfies any of the one or more active profiles; and
   upon success, storing the log record of the further task.

7. The computer implemented method of claim 6, wherein the checking comprises:
   performing a logical expression combining log metadata of the log record of the further task and log metadata of the one or more active profiles.

8. The computer implemented method of claim 4, wherein the determining is performed until a stop condition is fulfilled, the computer implemented method further comprising:
   performing an intermediate storage of the at least one profile in an in-memory during the determining step; and
   persisting the intermediate storage of the at least one profile after the stop condition is fulfilled.

9. The computer implemented method of claim 4, further comprising:
   creating another profile, referred to as a background profile, for background tasks of the computer system; and
   subtracting entries of the background profile from the at least one profile;
   wherein the logging of the execution outputs of the further task is performed based on the subtracted entries of the background profile from the at least one profile.

10. The computer implemented method of claim 4, further comprising:
    creating other profiles for other types of tasks of the computer system;
    receiving a request to execute a workload comprising tasks being a combination of two or more types of the tasks;
    combining profiles associated with the two or more types of the tasks, thereby rejecting duplicate entries;
    executing a received task; and
    logging an execution output of the received task based on the combined profiles associated with the two or more types of the tasks.

11. The computer implemented method of claim 10, further comprising:
    combining the profiles associated with the two or more types of the tasks by applying a set logical operation.

12. The computer implemented method of claim 1, wherein the determining is performed until a stop condition is fulfilled, and wherein the stop condition is any one of: a time-based stop condition, a received explicit stop, a space-driven stop condition, and the at least one task is done.

13. The computer implemented method of claim 1, wherein the determining is performed automatically upon an end of a warmup phase of the computer system, and wherein the warmup phase of the computer system is a predefined time period or a time period for reaching a certain code point.

14. The computer implemented method of claim 1, wherein the determining is performed in a test run before the computer system is deployed or in response to a demand by a user after the computer system has been deployed.

15. The computer implemented method of claim 1, wherein the execution of the further task at the computer system and the logging of the execution outputs of the further task are performed for debugging the further task in response to an execution error in an initial execution of the further task.

16. The computer implemented method of claim 1, further comprising:

receiving a request to debug the further task via an application programming interface; and in response to receiving the request, performing the execution of the further task at the computer system and the logging of the execution outputs of the further task.

17. The computer implemented method of claim 1, wherein the determining step is performed at runtime after a compiled source code of the at least one task and the further task has been deployed to the computer system.

18. The computer implemented method of claim 17, further comprising:

in response to determining that the compiled source code of the at least one task and the further task has changed, maintaining at least one profile for logging further tasks.

19. A computer program product comprising a computer system including a computer readable storage medium having computer readable program code embodied therewith, the computer readable program code executable by the computer system to:

execute at least one task at the computer system;

determine, from an execution log output of the at least one task, a set of log metadata and an associated set of log levels of log records of the at least one task;

execute a further task at the computer system;

log execution outputs of the further task according to the determined set of log metadata and the associated set of log levels of the log records of the at least one task, wherein the logging of the execution outputs of the further task includes storing a log record whose log metadata and log level match a specific log metadata of the set of log metadata and an associated log level of the associated set of log levels of the log records of the at least one task;

compare the associated set of log levels of the log records of the at least one task with the log level of the log record to be stored; and perform the storage of the log record based on a successful result of the comparison.

20. A system, which comprises:

a computer system including a computer processor, a computer readable storage medium, and program instructions stored on the computer readable storage medium and being executable by the computer processor, to cause the computer system to:

execute at least one task at the computer system;

determine, from an execution log output of the at least one task, a set of log metadata and an associated set of log levels of log records of the at least one task;

execute a further task at the computer system;

log execution outputs of the further task according to the determined set of log metadata and the associated set of log levels of the log records of the at least one task, wherein the logging of the execution outputs of the further task includes storing a log record whose log metadata and log level match a specific log metadata of the set of log metadata and an associated log level of the associated set of log levels of the log records of the at least one task;

compare the associated set of log levels of the log records of the at least one task with the log level of the log record to be stored; and perform the storage of the log record based on a successful result of the comparison.

* * * * *